(12) United States Patent
Chiu (10) Patent No.: US 6,512,340 B1
(45) Date of Patent: Jan. 28, 2003

(54) TEMPERATURE SENSOR WITH CURRENT MODE OUTPUT FOR THERMAL PROTECTION FOR A CATHODE RAY TUBE (CRT) DRIVER

(75) Inventor: Hon Kin Chiu, Hayward, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/948,922

(22) Filed: Sep. 7, 2001

(51) Int. Cl.[7] .................................................. G09G 1/04
(52) U.S. Cl. ........................ 315/401; 315/403; 315/383; 348/244; 348/255; 348/655
(58) Field of Search ............................ 315/3, 383, 370, 315/387, 401, 403, 368.18; 348/244, 255, 644, 655, 657, 687, 690; 345/20, 212, 213

(56) References Cited

U.S. PATENT DOCUMENTS

| | | | | |
|---|---|---|---|---|
| 4,121,252 A | * | 10/1978 | Saiki et al. | 348/380 |
| 5,036,387 A | * | 7/1991 | Umezawa | 348/635 |
| 5,814,953 A | * | 9/1998 | George | 315/397 |
| 6,091,397 A | * | 7/2000 | Lee | 345/20 |
| 6,163,314 A | * | 12/2000 | Lin | 345/211 |

* cited by examiner

*Primary Examiner*—Haissa Philogene
(74) *Attorney, Agent, or Firm*—Wagner, Murabito & Hao LLP (57) ABSTRACT

One embodiment of the present invention includes a temperature sensor with current mode output utilized within a cathode ray tube (CRT)-based display system for providing thermal protection to a CRT driver. Specifically, the current mode output temperature sensor of the present embodiment is implemented with the CRT driver of the CRT display system. Furthermore, the temperature sensor has a current sink output that is connected to an Automatic Brightness Limiter (ABL) circuit of the CRT display. The current sink of the temperature sensor operates in a manner similar to an "OR gate" with the CRT anode current. As such, when the CRT driver temperature rises above a threshold temperature, the current mode output temperature sensor sinks a current and activates the ABL circuit. As a result, the video amplitude of the CRT driver is reduced and its temperature is stabilized.

20 Claims, 9 Drawing Sheets

TEMPERATURE SENSOR WITH CURRENT MODE OUTPUT FOR THERMAL PROTECTION FOR A CATHODE RAY TUBE (CRT) DRIVER

TECHNICAL FIELD

The present invention relates to the field of cathode ray tube (CRT)-based display technology. More specifically, the present invention relates to the field of thermal protection for a CRT-based display system using a current mode output temperature sensor.

BACKGROUND ART

The cathode ray tube (CRT) remains the dominant display technology for a wide range of application for both consumers and professionals. CRT-based display system has become an integral tool used in a wide variety of different display applications, such as in video display, computer terminal display, instrumentation (such as oscilloscope), radar, image recording, specialized military application, medical imaging, etc. As requirements for greater resolution and color purity have increased, improvements have also been made in the design and manufacture of CRT devices and their signal driving circuits. Within the last 10 years, improvements to the basic monochrome and color CRT have been pushed by the explosion of the personal computer industry and by the increased picture resolution demanded by end-users. Display size has also been a key element in CRT development. Furthermore, the acceptance of VGA (Video Graphics Adapter) computer monitors and high-definition television (HDTV) has accelerated this trend. For example, an HDTV, such as a Sony Trinitron, has 16:9 aspect ratio viewing area, horizontal resolution of over 1000 lines and vertical resolution of over 750 lines.

A typical CRT-based display system includes a CRT driver and a CRT display unit. The CRT display unit further includes a cathode ray tube (CRT) and a display screen. The CRT driver provides driving signals to the CRT display unit. As aspect ratio viewing area and resolution of the CRT-based display system increases, the amplitude and frequency of the signal input to the CRT driver also increase, causing significant power dissipation problems. For example, higher power dissipation shortens the lifetime of a CRT. Intuitively, the conventional heat sink does not solve the power dissipation problems because a heat sink for high power dissipation is bulky and costly. For example, placing a heat sink at the neck of a CRT display unit to reduce the temperature will add unwanted weight to a CRT-based display system such as television and VGA computer monitors. In addition, a bulky heat sink placed near the CRT display unit causes transportation problems because the CRT is a fragile and complicated tube. It is very difficult and expensive to manufacture a CRT. Materials used in an effective heat sink are very heavy, especially at high temperature. Therefore, it is undesirable to add a heavy and bulky heat sink in the vicinity of a CRT to dissipate heat.

Another approach to solve the temperature-associated problems for a CRT-based display system is to use automatic thermal shutdown. However, automatic shutdown for television or other CRT-based display systems is not preferable to the end-users. Another method to solve the temperature problems in a CRT-based display unit is to use low bandwidth and amplitude signals for the CRT driver. However, low bandwidth and amplitude equal low power. When less power is used, the picture becomes fuzzier because the brightness of a picture on a display screen is directly proportional to the power supplied to the electron gun of the CRT. In high-resolution display applications, wide bandwidth power amplifiers are used to enhance the picture quality. Therefore, reduced bandwidth and amplitude in the pre-amplifier does not solve the heat dissipation problems inside a CRT-based display system.

Yet another method used widely in the existing CRT-display system to reduce the temperature-associated problems is an Automatic Brightness Limiter (ABL) circuit. The ABL is a gain control circuit that controls the gain of a video pre-amplifier used in the CRT display unit. However, the ABL does not measure the temperature of the amplifier, but instead it measures the average DC current of the CRT. Therefore, an ABL can typically only monitor the temperature problems caused by a large amplitude current but not those caused by a high frequency of the video signals.

SUMMARY OF THE INVENTION

Accordingly, a need exists for achieving a low-cost, compact, and light-weight method and system for solving the power dissipation problems inherent in high-resolution CRT display applications so that the high temperature generated by amplitude and frequency signals is handled without having a thermal shutdown or sacrificing picture quality. The present invention provides a method and system which satisfies the above mentioned need.

For example, one embodiment of the present invention includes a temperature sensor with current mode output that is utilized within a cathode ray tube (CRT)-based display system for providing thermal protection to a CRT driver. Specifically, the current mode output temperature sensor of the present embodiment is implemented with the CRT driver of the CRT display system. Furthermore, the temperature sensor has a current sink output that is connected to an Automatic Brightness Limiter (ABL) circuit of the CRT display. The current sink of the temperature sensor operates in a manner similar to an "OR gate" with the CRT anode current. As such, when the CRT driver temperature rises above a threshold temperature, the current mode output temperature sensor sinks a current and activates the ABL circuit. As a result, the video amplitude of the CRT driver is reduced and its temperature is stabilized.

In another embodiment, the present invention provides a method for using a current mode output temperature sensor to provide thermal protection to a CRT driver. The method includes setting a temperature independent reference voltage. Additionally, the method includes setting a threshold temperature for the current mode output temperature sensor. Furthermore, the method includes coupling the current mode output temperature sensor to the CRT driver. The method also includes electrically coupling the current mode output temperature sensor to an Automatic Brightness Limiter (ABL) circuit. Moreover, the method includes determining if the temperature of the CRT driver exceeds the threshold temperature by utilizing the temperature independent reference voltage. In response to the temperature of the CRT driver exceeding the threshold temperature, the method includes the current mode output temperature sensor activating the ABL circuit and reducing the amplitude of a video signal received by the CRT driver in order to thermally protect the CRT driver.

In yet another embodiment, the present invention provides a current mode output temperature sensor for providing thermal protection to a CRT driver. The current mode output temperature sensor includes a comparator circuit coupled to a first current source. Additionally, the current mode output temperature sensor includes a voltage reference unit coupled to the comparator circuit and for providing a temperature independent voltage reference. Moreover, the current mode output temperature sensor includes a temperature sensing unit coupled to the comparator and for measuring temperature of the CRT driver. The current mode output temperature sensor includes also includes a temperature threshold setup unit coupled to the temperature sensing unit and for setting a threshold temperature. It should be understood that the current mode output temperature sensor thermally protects the CRT driver by reducing the amplitude of a video signal received by the CRT driver when the temperature of the CRT driver exceeds the temperature threshold.

These and other advantages of the present invention will become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on electrical signals within a CRT-based display system. These descriptions and representations are the means used by those skilled in the CRT display arts to most effectively convey the substance of their work to others skilled in the art. In the present application, a procedure, circuit block, process, etc., is conceived to be a self-consistent sequence of steps or instructions leading to a desired result. The steps are those requiring physical manipulations of physical quantities. Usually, though not necessarily, these quantities take the form of analog or digital electrical signals capable of being amplified, stored, transferred, combined, compared, controlled and otherwise manipulated in a CRT-based display system. It has proved convenient at times, principally for reasons of common usage, to refer to these signals as values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "amplifying", "current sinking", "controlling", "tracking", "receiving", "storing", "transmitting", "reallocating" or the like, refer to the actions and processes of a CRT display system, or similar display device. The CRT display system or similar display device receives and displays signals represented as physical (electronic) quantities within the CRT display's video pre-amplifiers and CRT driver into other digital or analog signals similarly represented as physical quantities within the computer system memories or registers or other such information storage, transmission, or display devices. The present invention is also well suited to the use of other video display systems such as, for example, computer monitors, medical equipment, radar display unit, etc.

DETAILED DESCRIPTION OF THE STRUCTURE AND OPERATION OF THE PRESENT INVENTION

Figure 1:
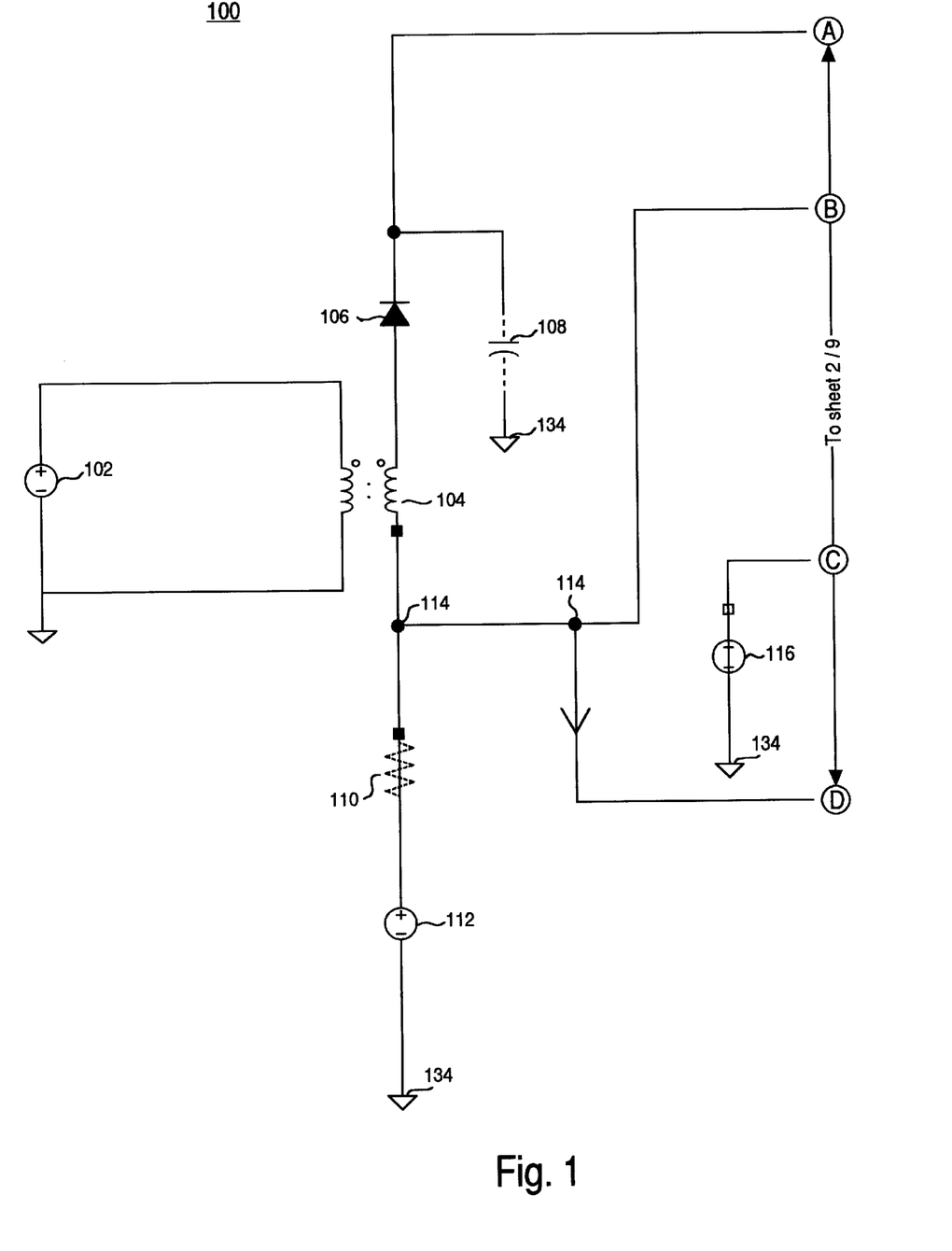
FIG. 1 illustrates a block diagram of a CRT-based display system with an output current mode temperature sensor for providing thermal protection to a CRT driver in accordance with an embodiment of the present invention.

FIG. 1 illustrates a block diagram of a cathode ray tube (CRT)-based display system 100 with an output current mode temperature sensor 126 for providing thermal protection to a CRT driver 124 in accordance with an embodiment of the present invention. Specifically, the output current mode temperature sensor 126 has a current sink output that is connected to an Automatic Brightness Limiter (ABL) circuit 120 of the CRT display system 100. The current sink of the temperature sensor 126 operates in a manner similar to an "OR gate" with the CRT anode current 130. As such, when the temperature of the CRT driver 124 rises above a threshold temperature, the temperature sensor 126 sinks a current and activates the ABL circuit 120. As a result, the video amplitude to the CRT driver 124 is reduced and the temperature of the CRT driver 124 is stabilized.

Within the present embodiment, the temperature sensor 126 includes a comparator which compares a threshold temperature to a temperature measured from the CRT driver 124. Additionally, the temperature sensor 126 provides a current mode output to part of the CRT-based display system 100. Specifically, in a normal condition in which the temperature of the CRT driver 124 is below the threshold temperature, output terminal 125 of the temperature sensor 126 does not draw any current because its output impedance is very high. And when the output impedance of the temperature sensor 126 is high and there is no output current, the temperature sensor 126 is electrically isolated from the rest of system 100. Furthermore, diode 120A is forward biased by voltage source 112 through the resistor 110. Thus, the voltage at node 114 is approximately 0.7 V higher than voltage source 120B. However, when the temperature of the CRT driver 124 is above the threshold temperature, the temperature sensor 126 detects this temperature difference and causes its output impedance at output terminal 125 to become low. Consequently, the decrease in the output impedance at the output terminal 125 of the temperature sensor 126 causes a current to flow to electrical ground VEE 134. Thus, the sinking current causes a voltage drop across resistor 110 to increase. Additionally, the drop in voltage at the node 114 causes diode 120A to be reverse biased, reducing the voltage at the node 114 and causing the video pre-amplifier 118 to reduce its gain. As a result, the temperature of the CRT driver 124 is stabilized. Therefore, thermal shutdown and damage to the CRT display unit 128 is avoided.

Within FIG. 1, system 100 includes an AC (alternating current) power supply 102 that is coupled to a fly-back transformer 104 in order to provide DC (direct current) power to system 100. The fly-back transformer 104 is well known by those of ordinary skill in the art and is commonly used in other CRT-based display systems such as televisions and VGA monitors. Within the present embodiment, there are a wide variety of means for coupling AC power supply 102 to the CRT based display system 100. Within CRT system 100, the fly-back transformer 104 is coupled to a diode 106 which is coupled to a capacitor 108. The capacitor 108 is coupled to ground 134. Additionally, a resistor 110 is coupled to a DC voltage supply 112 and is also coupled to the fly-back transformer 104. A video input 116 is coupled to a video pre-amplifier 118 and also coupled to ground 134. An Automatic Brightness Control (ABL) circuit 120 is coupled to resistor 110 at a node 114. Specifically, the ABL circuit 120 includes a diode 120A that is coupled to a voltage supply 120B which is coupled to ground 134. A CRT driver system 122 includes a temperature sensor 126 with current mode output that is in close proximity to the CRT driver 124. The temperature sensor 126 has an output 125 that is coupled to node 114 and to the ABL circuit 120. A CRT display unit 128 is coupled to the CRT driver system 122. Moreover, the temperature sensor 126 is coupled to a DC voltage supply VCC 132.

In FIG. 1, diode 106 has an anode and a cathode. The anode of diode 106 is coupled the fly-back transformer 104 while its cathode is coupled to capacitor 108 and the anode current source 130 of the CRT display unit 128. Within the present embodiment, diode 106 rectifies the AC signal of power supply 102 by passing only its positive cycles and rejecting its negative cycles. The capacitor 108 acts as a low pass filter which passes only DC signals and rejects any high frequency signals. During the negative cycle of the AC signal of power supply 102, the capacitor 108 provides a positive voltage in the form of stored electrical charges from the previous positive cycle. Thus, the diode 106 and the capacitor 108 used within the present embodiment form a rectifying circuit that converts the AC power supply 102 into DC voltage. The present embodiment is well suited for allowing other rectifying means to effectively convert AC power supply 102 into DC voltage.

The ABL circuit 120 is well known in the art and has an input terminal coupled to node 114. In the present embodiment, the ABL 120 includes diode 120A and voltage supply 120B. The diode 120A is implemented as a pn junction diode that has an anode and a cathode. The anode of the diode 120A is the input terminal of the ABL 120 while its cathode is coupled to voltage supply 120B. Therefore, when the voltage at node 114 is greater than that of voltage supply 120B plus the knee voltage of the diode 120A, the diode 120A begins conducting thereby causing a forward current to flow from node 114 to ground 134 which decreases the voltage at node 114.

It should be appreciated that the ABL 120 of FIG. 1 is similar to a Zener diode wherein the Zener voltage is approximately equal to 0.7 V plus the voltage of voltage source 120B. The anode of diode 120A is coupled to node 114. The resistor 110 is coupled to node 114 and to the voltage supply 112. This is equivalent to a voltage regulator wherein its output node is node 114. When there is a high current flow across resistor 110, the voltage between node 114 and ground 134 cannot be regulated and drops. The decrease in voltage at node 114 causes the diode 120A to turn off. The decrease in voltage at node 114 also causes the reduction of the gain of the video pre-amplifier 118. It should be noted that the cooperation between resistor 110 and DC supply voltage 112, the ABL 120, and the current mode output temperature sensor 126 in order to balance the temperature of system 100 is described in detail later.

The video input 116 is a video signal source having amplitude and frequency. The amplitude of the video signal input 116 corresponds to the brightness displayed at the CRT display unit 128 while its frequency corresponds to the vertical scan rate of a displayed picture. In a high-definition display system such as a HDTV or a VGA computer monitor, both amplitude and frequency of video signal input 116 may become very high thereby causing the CRT driver 124 to overheat.

The video pre-amplifier 118 has an input terminal 117, an output terminal 119, and a voltage-controlled gain control terminal 115. Specifically, the gain control terminal 115 is coupled to node 114, the output terminal 119 is coupled to the CRT driver system 122, and the input terminal 117 is coupled to the video input 116. Inside the video pre-amplifier 118 is a multiplier 118 A. The input 115 from node 114 to multiplier 118 A provides the gain control for video pre-amplifier 118. The ABL 120 keeps the gain of the video amplifier constant. In particular, when the voltage at node 114 is greater than the supply voltage 120B plus the knee voltage (e.g., 0.7 V) of diode 120A, the diode 120A conducts causing a current to flow from its anode to the ground VEE 134 thereby limiting the voltage at the voltage-controlled gain terminal 115 of the video amplifier 118 to a constant voltage. It is understood that because of its limiting behavior, a diode is commonly referred to as a limiter.

Within FIG. 1, the CRT driver system 122 comprises the CRT driver 124 and the current mode output temperature sensor 126. The current mode output temperature sensor 126 has three terminals: an output terminal 125 electrically coupled to node 114, a VCC terminal 126 A electrically coupled to voltage supply 132, and a ground terminal 126B coupled to electrical ground VEE 134. The current mode output temperature sensor 126 may be in close proximity to the CRT driver 124 either by an integration process of integrating temperature sensor 126 into the CRT driver 124 during a fabrication process or by a process (e.g., mechanical) of placing the temperature sensor 126 near the CRT driver 124. The former process is preferred because it adds substantially no weight to system 100. Furthermore, the electrical characteristics of the current mode output temperature sensor 126 may be designed and adjusted to be readily compatible with other requirements of system 100.

The CRT display unit 128 has a cathode terminal and an anode terminal that are coupled to the anode current source 130. The cathode terminal of the CRT display unit 128 is coupled to the output terminal of the CRT driver 124. Additionally, the anode terminal of the CRT display unit 128 is coupled to the diode 106 and the capacitor 108.

In FIG. 1, the output terminal 125 of the current mode output temperature sensor 126 also operates as an OR-gate between the ABL 120 and the anode current 130 of the CRT display unit 128. Specifically, when the temperature of the CRT driver 124 rises above the threshold temperature, the temperature sensor 126 sinks or draws the current to the electrical ground VEE 134 in the manner discussed herein. The sinking current at node 114 causes a voltage drop across resistor 110 to increase and thereby reduces the gain of video pre-amplifier 118. The conducting diode 106 causes the anode current 130 of the CRT display unit 128 to increase. Consequently, the anode current 130 causes the brightness of the CRT display unit 128 to decrease because when the anode current 130 increases, the gain of the video pre-amplifier 118 is reduced.

Accordingly, the current mode output temperature sensor 126 coupled to the ABL 120 of the present embodiment may stabilize the temperature of the CRT driver 124 in two different ways: either by reducing the gain of the video pre-amplifier 118 and thus reducing the strength of the signal input to the CRT driver 124 or by increasing the anode current 130 of the CRT display unit 128 and thereby directly reducing the gain of the video pre-amplifier 118.

Although a number of different component configurations may be utilized in accordance with the present embodiment of the CRT-based display system 100, Table 1 below illustrates exemplary component assignments for FIG. 1.

TABLE 1

| Component | Approximate Component Value |
|---|---|
| Voltage Source 102 | 100 Volts |
| Capacitor 108 | 500 picofarads |
| Resistor 110 | 100 kilo-ohms |
| Voltage Supply 112 | 100 Volts |
| Voltage Supply 120B | 12 Volts |
| Supply VCC 132 | 12 Volts |
| Fly-Back Transformer 104 | Output Voltage for the CRT Anode = 24000 Volts |

Figure 2:
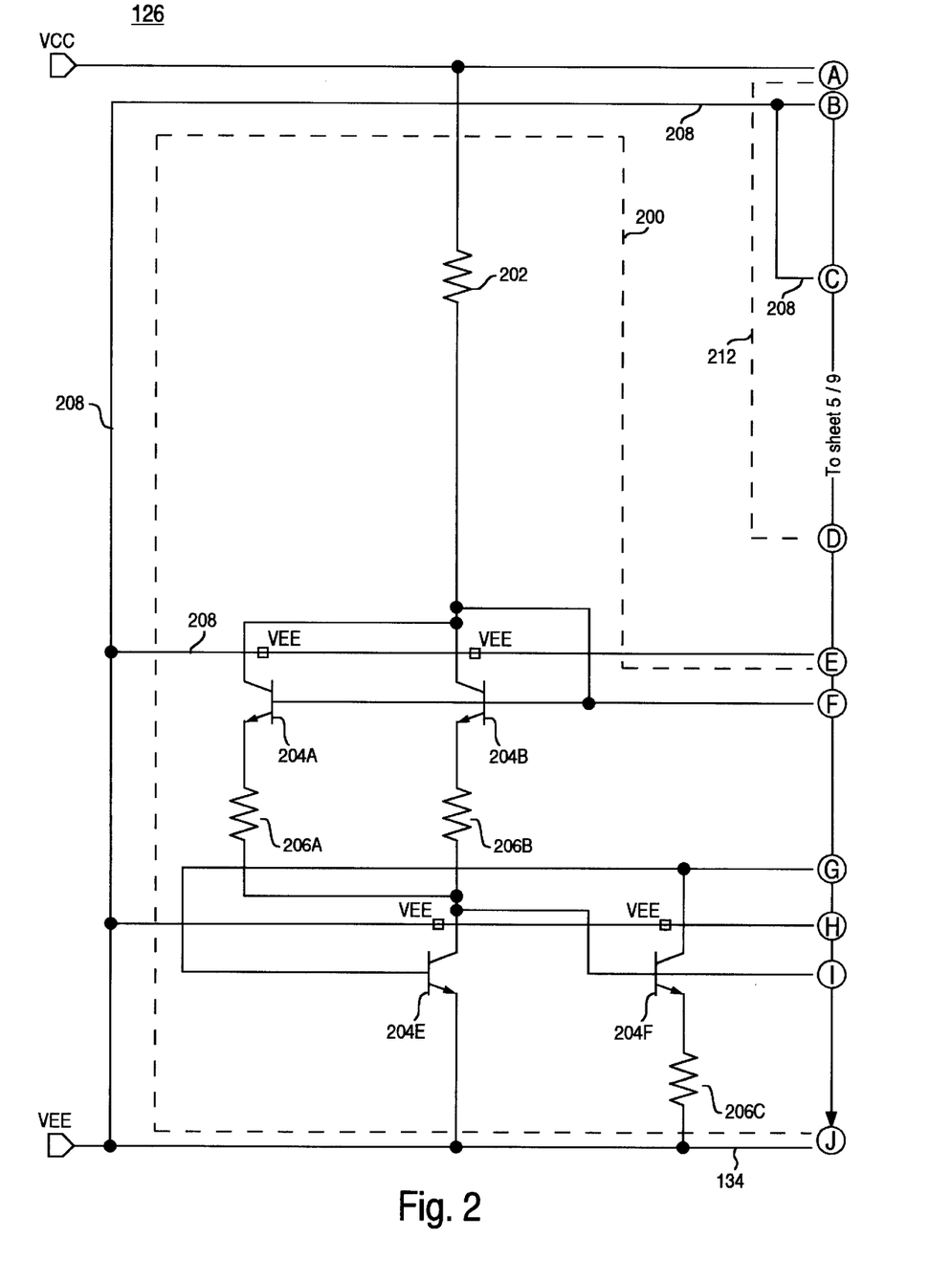
FIG. 2 illustrates a schematic diagram of a current mode output temperature sensor in accordance with an embodiment of the present invention.

FIG. 2 illustrates a schematic diagram of the current mode output temperature sensor 126 in accordance with an embodiment of the present invention. Specifically, the current mode output temperature sensor 126 is in close proximity to the CRT driver 124 and is coupled to the ABL 120 in order to maintain an equilibrium temperature for CRT-based system 100. That is, when the temperature of the CRT driver 124 exceeds a threshold temperature, the temperature sensor 126 causing a current to sink at its output 125 thereby reducing the gain of the ABL 120 and stabilizing the temperature of the CRT driver 124.

Specifically, the temperature of the CRT driver 124 is measured by circuit blocks 200 and 212. When the temperature of the CRT driver 124 is below the threshold temperature, the differential input voltage of the emitter-coupled pair 220 is substantially zero and thus the differential output at the collector of transistor 220A is low. Therefore, the transistors 222A and 222B are in a cut-off state. Accordingly, there is no current flowing through the collector of transistor 222B or output 125. In addition, when current source 222 is in the cut-off state, the output impedance at output 125 of the temperature sensor 126 is very high. As a result, the temperature sensor 126 is isolated from the rest of the CRT-based display system 100.

However, when the temperature of the CRT driver 124 increases beyond the threshold temperature, the current flow through resistors 216A–216F of FIG. 2 begins to increase causing the voltage drops to increase across resistors 216B through 216E. At the same time, a voltage reference from a band-gap reference circuit 212 remains constant with temperature. As a result, the input differential voltage between transistors 220A and 220B of the emitter-coupled pair 220 also increases. As such, the transistor 220A is turned on. The current flows from the collector of transistor 220A to the collector of transistor 222A. Accordingly, the voltage experienced at the collector and base of transistor 222A increases in magnitude. Subsequently, transistor 222A is turned on and causes a current sink in the collector of transistor 222B since transistors 222A and 222B form the current source 222. As such, the current sink in the collector of transistor 222B reduces the gain of the ABL 120 and stabilizes the temperature of the CRT driver 124.

Within the present embodiment, the current mode output temperature sensor 126 includes a biasing current source 200, temperature-independent voltage reference unit 212, and temperature threshold setup unit 216. Furthermore, the temperature sensor 126 includes comparator 220, a resistor 218 providing a bias current for comparator 220, and an open collector current source 222. The temperature sensor 126 also includes a resistor 224 for coupling voltage supply VCC 132 to different layers of the temperature sensor 126 and a ground trace 208 for shielding off unwanted signal interference between different circuit components within the temperature sensor 126.

Within FIG. 2, the biasing unit 200 is designed to provide biasing current reference that is dependent on the ambient temperature of the current mode output temperature sensor 126. Specifically, the biasing unit 200 is a current source which comprises 9 npn bipolar junction transistors (BJT) 204A–204I and resistors 202 and 206A–206F. These components of biasing unit 200 are coupled together in order to provide a temperature dependent bias current to the voltage reference circuit 212 and the temperature threshold setup unit 216.

Within biasing unit 200, the bases of transistors 204A through 204D are coupled together. The collector of transistor 204A is coupled to the collector of transistor 204B which is also coupled to its base. The collectors of transistors 204A and 204B are coupled to one end of resistor 202. The other end of resistor 202 is coupled to the VCC 132 in order to create a current reference to the collector of transistor 204B. The value of the reference current may be calculated when the values of voltage supply VCC 132 and resistor 202 are known. For example, if the VCC 132 is equal to 12 volts and the resistance of the resistor 202 is equal to 120 kilo-ohms, the current reference flowing through the collector of the transistor 204B is equal to about 100 micro-amps ($\mu A$). The emitter of transistor 204A is coupled to one end of resistor 206A while the emitter of transistor 204B is coupled to one end of resistor 206B. The other ends of resistors 206A and 206B are coupled to the collector of transistor 204E. The bases of transistors 204F–204I are coupled together. The base of transistor 204E is coupled to the collectors of transistors 204F and 204G. The emitter of transistor 204E is coupled to ground VEE 134. The base of transistor 204F is coupled to the collector of the transistor 204E. The emitter of transistor 204F is coupled to one end of the resistor 206C, while the other end of resistor 206C is coupled to ground VEE 134.

Similarly, the emitters of transistors 204G, 204H, and 204I of FIG. 2 are coupled to one end of resistors 206D, 206E, and 206F, respectively, while the other end of resistors 206D–206F are coupled to electrical ground VEE 134. The collector of transistor 204G is coupled to the emitter of the transistor 204C. The collector of the transistor 204H is coupled to the emitter of transistor 204D and to the collector of transistor 204I. The biasing current source 200 of the present embodiment is specifically arranged in order to create a current source which depends on the temperature resilient band-gap voltage VBE(on) of transistors 204A–204I.

Within the temperature sensor 126 of the present embodiment, the temperature-independent voltage reference unit 212 sets the reference voltage by using two bipolar junction transistors (BJT) 212A and 212B and a resistor 214. The collectors of transistors 212A and 212B are coupled to their bases. The collector of transistor 212A is also coupled to the voltage supply VCC 132. Additionally, the emitter of transistor 212A is coupled to the collector of transistor 212B. The emitter of transistor 212B is coupled to resistor 214. As such, the voltage reference ($V_{ref}$) at the other terminal of resistor 214 may be set at:

$$V_{ref} = VCC\ 132 - (2 \cdot VBE(on)) - (\text{voltage drop across the resistor 214})$$

where VBE(on) is the base emitter voltage of transistors 212A and 212B when they are in the ON state. The typical VBE(on) of a bipolar junction transistor is 0.7 volts at room temperature. The VBE of a typical BJT is resilient to the change in ambient temperature and has a temperature coefficient of −2 millivolts (mV)/degrees Celsius. A person of ordinary skill in the art may calculate the reference voltage when the voltage of VCC 132 and the resistance value of resistor 214 are known.

Within FIG. 2, the temperature sensor 126 sets the threshold temperature via temperature threshold setup unit 216. The temperature threshold setup unit 216 includes six resistors 216A–216F and three laser-trimmed metal traces 217A–217C. Specifically, resistor 216A is coupled to the VCC 132 and in series with resistors 216B, 216C, 216D, and 216F, respectively. The resistors 216D and 216E are coupled in parallel. Additionally, metal trace 217C is coupled in parallel with resistors 216D and 216E. The metal trace 217B is coupled in parallel with resistor 216C while metal trace 217A is coupled in parallel with resistor 216B and is also coupled to voltage supply VCC 132. Each of metal traces 217A–217C includes a pair of metal contacts separated by substantially 3 microns. It is understood that the temperature coefficient of the collector currents of the transistors 204C and 204D have positive temperature coefficients and the VBE(on) of the transistors 212A and 212B have negative temperature coefficients. Specifically, when the temperature of the CRT driver 214 increases beyond the threshold temperature, the voltage drop increases across each of resistors 216B–216E. As a result, the voltage at resistor 216F decreases. The rate of the voltage drop depends on the values of resistors 216B–216E and the temperature characteristic of the collector current of transistor 204D.

One of the main components of the current mode output temperature sensor 126 is comparator 220. The comparator 220 is an emitter-coupled pair that compares the reference voltage from the temperature-independent unit 212 and the measured voltage from the temperature threshold setup unit 216. Specifically, comparator 220 includes two pnp bipolar junction transistors 220A and 220B. The resistor 218 is coupled to the power supply VCC 132 and to the emitters of transistor 220A and 220B. The emitters of transistors 220A and 220B are coupled together. Additionally, the base of transistor 220B is coupled to resistor 214 of the temperature-independent unit 212 while the base of the transistor 220A is coupled to resistor 216F of temperature threshold setup unit 216. The comparator 220 is biased by the current whose magnitude is equal to the voltage of VCC 132 divided by the resistance value of resistor 218.

In FIG. 2, the output stage of the temperature sensor 126 is a current source 222. The current source 222 includes two npn transistors 222A and 222B. The bases of transistors 222A and 222B are coupled together and are also coupled to the collector of the transistor 222A. The emitters of transistors 222A and 222B are coupled to electrical ground VEE 134. The collector of transistor 222A is coupled to the collector of transistor 220A while the collector of transistor 222B is output 125 of the temperature sensor 126. It is understood that output 125 is coupled to node 114 of FIG. 1. Therefore, when the temperature of the CRT driver 124 rises above the threshold temperature, the voltage at the bases of transistors 220A and 220B becomes a differential input to comparator 220. As such, the transistor 220A is turned on which causes the current to flow from the collector of transistor 220A to the collector of transistor 222A. Accordingly, the voltage experienced at the collector and base of transistor 222A increases in magnitude. Subsequently, transistor 222A is turned on and causes a current sink in the collector of transistor 222B and output 125. As such, the current sink in the collector of transistor 222B reduces the gain of the ABL 120 and stabilizes the temperature of the CRT driver 124.

Although a number of different component configurations may be used in accordance with the present embodiment of the current mode output temperature sensor 126, Table 2 below illustrates exemplary component assignments for FIG. 2.

TABLE 2

| Component | Approximate Component Value |
| --- | --- |
| Resistor 202 | 119.953 kilo-ohms |
| Resistor 206A–206F | 93.919 ohms |
| Resistor 214 | 1.273 kilo-ohms |
| Resistor 216A | 269.595 ohms |
| Resistor 216B | 134.459 ohms |
| Resistor 216C–216E | 66.892 ohms |
| Resistor 216F | 2.28 kilo-ohms |
| Resistor 218 | 995.313 ohms |
| Resistor 224 | 137.838 ohms |
| VBE(on) | 0.7 Volts |
| VCC 132 | 12 Volts |
| VEE 134 | Zero Volts |

Figure 3:
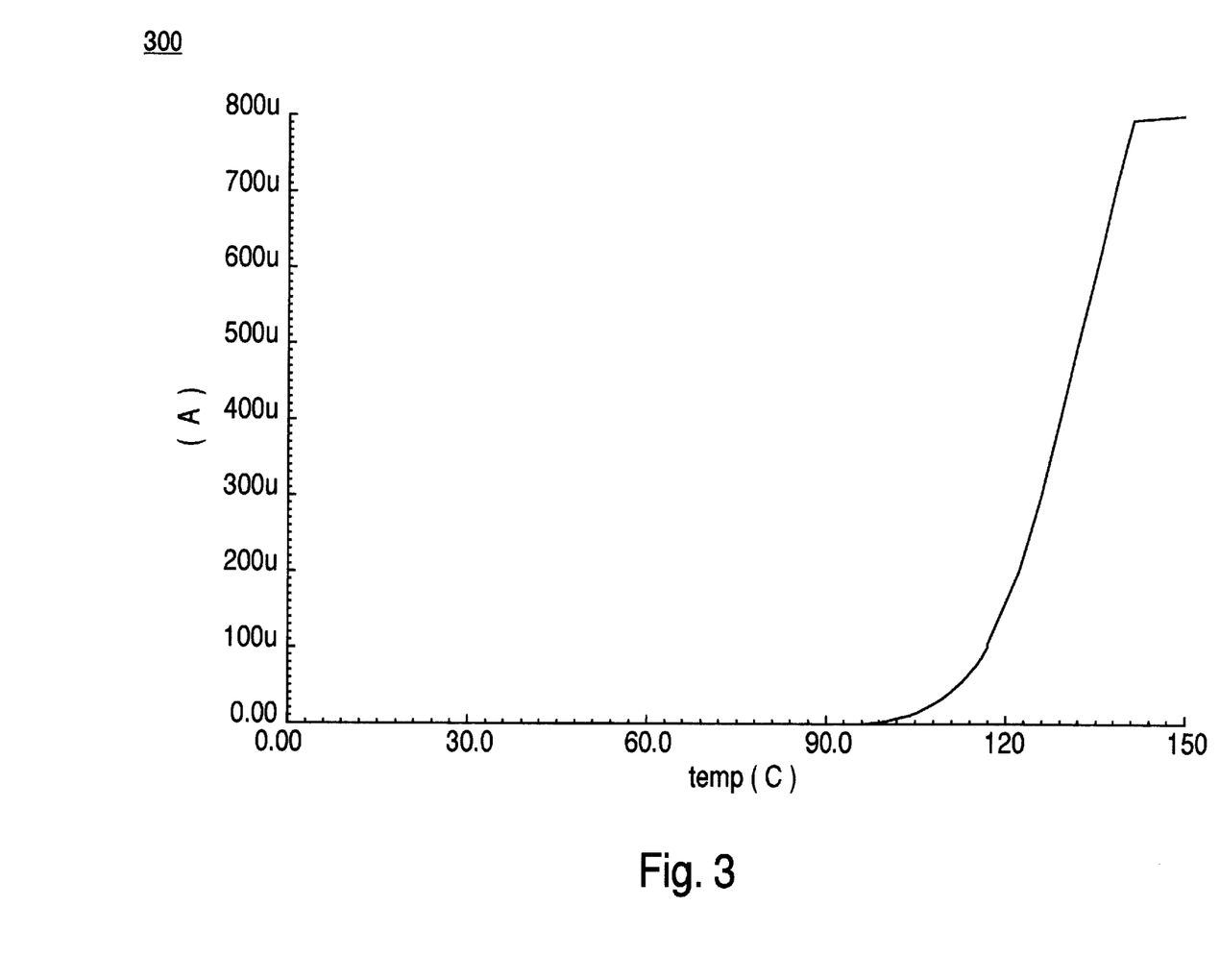
FIG. 3 illustrates a graph of the relationship between the DC response of the current mode output temperature sensor and the temperature change of a CRT driver in accordance with an embodiment of the present invention.

FIG. 3 is a graph 300 showing the relationship between the DC response of the current mode output temperature sensor 126 and the temperature change of CRT driver 124 in accordance with an embodiment of the present invention. Specifically, graph 300 shows the DC response of the collector current in transistor 222B (FIG. 2) versus the temperature change of the CRT driver 124. The vertical axis of graph 300 is the collector current in transistor 222B measured in microamps ($\mu A$) while the horizontal axis is the temperature of the CRT driver 124 measured in degrees Celsius (degrees C). Graph 300 illustrates that as the temperature of CRT driver 124 increases beyond the threshold temperature of 100 degrees C, the collector current in transistor 222B increases until it reaches about 800 $\mu$A at about 141 degrees C. Therefore, as described herein, the collector current in transistor 222B provides a current sink that reduces the gain of the ABL 120 (FIG. 1) and stabilizes the temperature of the CRT driver 124.

Figure 4:
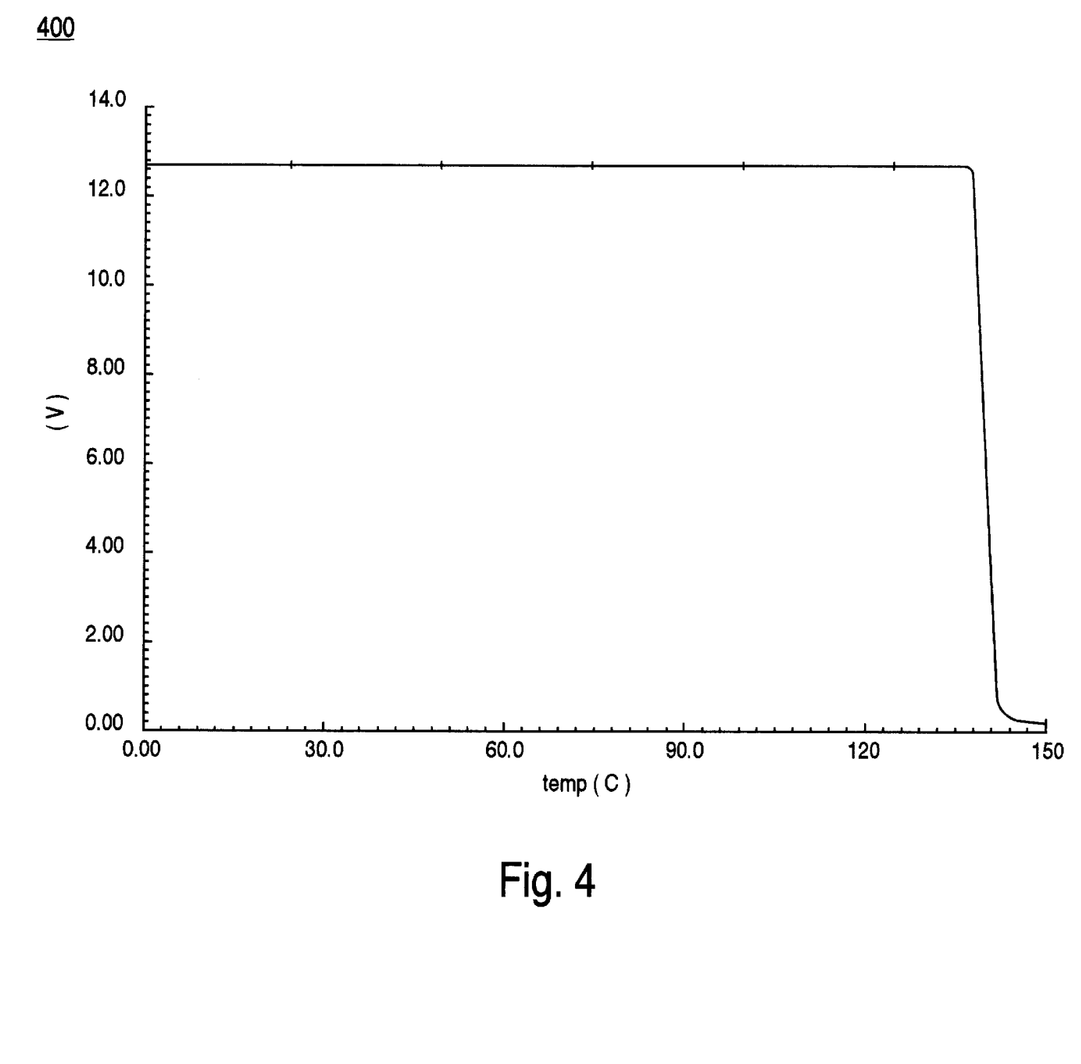
FIG. 4 illustrates a graph of the relationship between the voltage at a node coupled to the current mode output temperature sensor and the temperature change of a CRT driver in accordance with an embodiment of the present invention.

FIG. 4 is a graph 400 showing the relationship between the voltage at node 114 (FIG. 1) coupled to the current mode output temperature sensor 126 and the temperature change of CRT driver 124 in accordance with an embodiment of the present invention. Specifically, graph 400 shows the voltage at node 114 versus the temperature of the CRT driver 124. Graph 400 illustrates that when the temperature of the CRT driver 124 reaches about 138 degrees C, the voltage at node 114 drops very sharply from about 12.7 volts to about 0.2 volts. Accordingly, as the voltage of node 114 reaches substantially zero, the input voltage to multiplier 118A inside of the video pre-amplifier 118 is substantially zero thereby causing the whole system to want to shutdown. However, the feedback loop of the ABL 120 prevents the system shutdown from occurring. Specifically, as the voltage drops below 12.7 volts, diode 120A of the ABL 120 becomes non-conducting and substantially an open-circuit with infinite impedance. As the temperature of the CRT driver 124 keeps increasing due to the frequency component of the video signal input 116, the output current at output 125 of the temperature sensor 126 increases the voltage drop across resistor 110 and thus causes the gain of the video pre-amplifier 118 to be reduced. As a result, the video signal input 116 to the CRT driver 124 is reduced and its temperature also decreases which causes the current of the current mode output temperature sensor 126 to decrease. Subsequently, an equilibrium temperature for the CRT driver 124 is reached.

Figure 5:
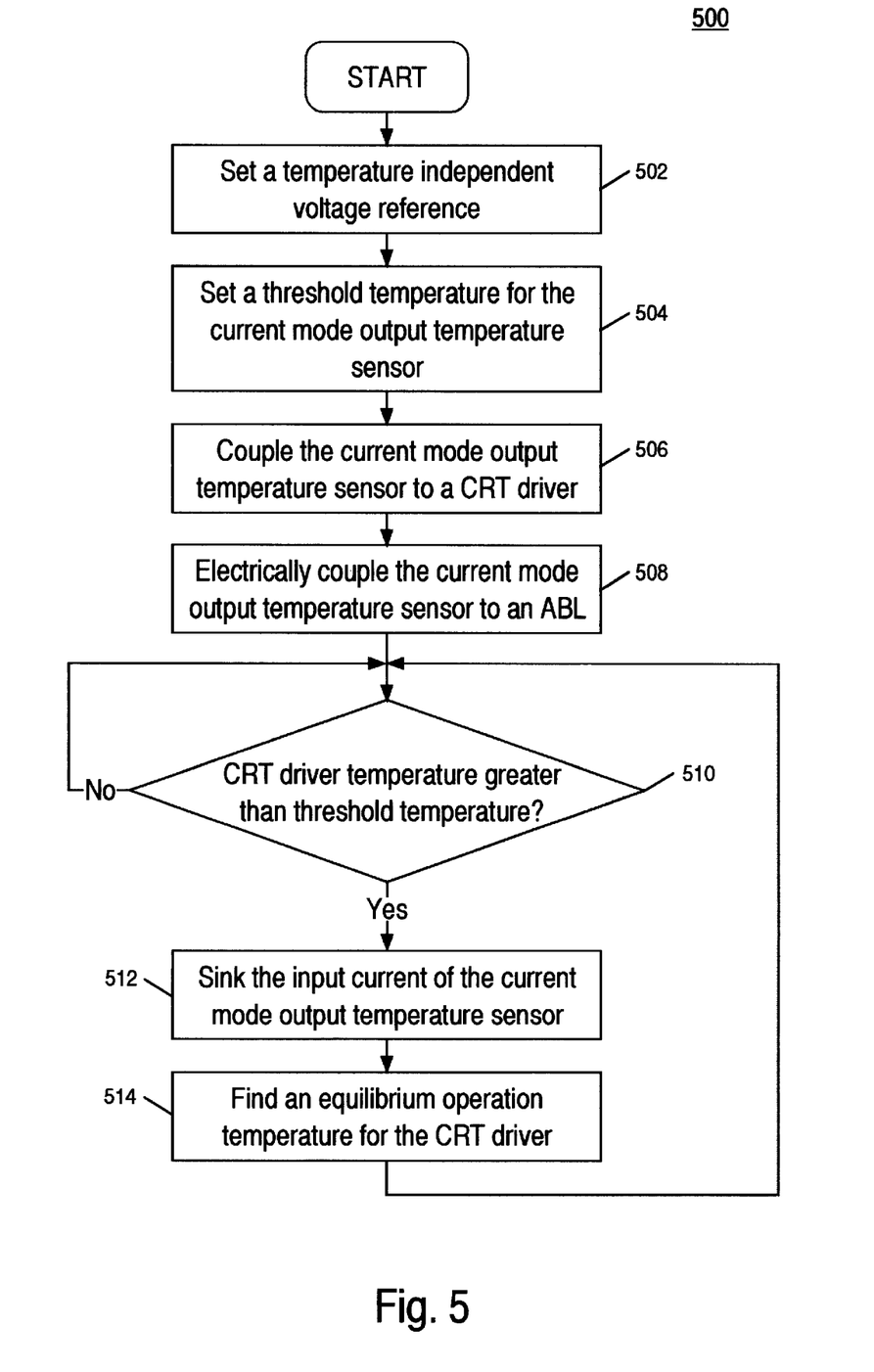
FIG. 5 illustrates a flowchart of a method for providing a temperature sensor with current mode output for thermal protection of a CRT driver in accordance with an embodiment of the present invention.

FIG. 5 is a flowchart 500 of a method for utilizing a temperature sensor (e.g., 126) with current mode output for thermal protection of a CRT driver (e.g., 124) in accordance with an embodiment of the present invention. Flowchart 500 includes processes of the present invention which, in one embodiment, are carried out by electrical components. Although specific steps are disclosed in flowchart 500, such steps are exemplary. That is, the present embodiment is well suited to performing various other steps or variations of the steps recited in FIG. 5. Within the present embodiment, it should be appreciated that the steps of flowchart 500 may be performed by hardware, by software, or by any combination of hardware and software.

Within the present embodiment, flowchart 500 provides a method for using a current mode output temperature sensor (e.g., 126) in connection with an Automatic Brightness Limiter (e.g., ABL 120) to provide thermal protection for a CRT driver (e.g., 124) in a CRT-based display system (e.g., 100).

At step 502, a temperature-independent reference voltage is set for a current mode output temperature sensor (e.g., 126) within a CRT-based display system (e.g., 100). It should be appreciated that the temperature-independent reference voltage of the present embodiment may be established in a wide variety of ways. For example, a band gap method may be utilized in order to set the temperature-independent voltage reference of the current mode output temperature sensor (e.g., 126). Specifically, the band gap method described herein with reference to FIG. 2 may be utilized at step 502. Furthermore, given the values of the components listed in Tables 1 and 2 herein, the temperature-independent reference voltage may be about 10 volts. Other methods to set the temperature-independent reference voltage may be used such as Zener diode, Field Effect Transistors (FET), etc.

In step 504 of FIG. 5, a threshold temperature for the current mode output temperature sensor (e.g., 126) is set by using a temperature threshold. setup unit (e.g., 216) that changes its voltage drop with temperature. It is understood that a wide variety of components may be utilized for the temperature threshold setup unit in accordance with the present embodiment. That is, depending on the safe operating temperature requirement of the CRT display system (e.g., 128), different temperature dependent components with known electrical characteristics may be chosen accordingly in order to set the threshold temperature. For example, resistors (e.g., 216A–216F) may be used, as described herein.

At step 506, the current mode output temperature sensor (e.g., 126) is put in close proximity to the CRT driver (e.g., 124) for measuring the temperature of the CRT driver. In the present embodiment, the current mode output temperature sensor (e.g., 126) is integrated within the CRT driver (e.g., 124) during the design and fabrication process of the CRT driver. However, other methods may also be used in accordance with the present embodiment. For example, the temperature sensor (e.g., 126) may be placed in the vicinity of the CRT driver (e.g., 124) so that its temperature-sensing unit (e.g., 126) can make contact with the body of the CRT driver 124. It should be pointed out that it is advantageous to utilize the integration method at step 506 since it results in a compact, ready-to-use CRT driver system (e.g., 122).

In step 508 of FIG. 5, the current mode output temperature sensor (e.g., 126) is electrically coupled to an ABL circuit (e.g., 120) of the CRT display system (e.g., 100). It should be appreciated that the current mode output temperature sensor (e.g., 126) operates with the ABL circuit (e.g., 120) in order to reduce temperature problems caused by high frequency signals received by the CRT display system (e.g., 100).

At step 510, the present embodiment determines whether the temperature of the CRT driver (e.g., 124) is greater than the threshold temperature set in step 504. If the temperature of the CRT driver (e.g., 124) is not greater than the threshold temperature, the present embodiment proceeds to the beginning of step 510. However, if the temperature of the CRT driver (e.g., 124) is greater than the threshold temperature, the present embodiment proceeds to step 512. It should be appreciated that the temperature of the CRT driver (e.g., 124) may be determined in a wide variety of ways in accordance with the present embodiment. For example, the current mode output temperature sensor (e.g., 126) may utilize a temperature sensitive voltage and the temperature-independent reference voltage in order to determine if the temperature of the CRT driver (e.g., 124) is greater than the threshold temperature. Specifically, the temperature sensing technique described herein with reference to FIG. 2 may be utilized at step 510.

In step 512 of FIG. 5, the current mode output temperature sensor (e.g., 126) sinks an input current to a video pre-amplifier (e.g., 118) of the CRT display system (e.g., 100) in order to reduce the input voltage of the ABL circuit (e.g., 120). It is understood that step 512 is well suited to be performed in a wide variety of ways in accordance with the present embodiment. For example, the temperature sensor (e.g., 126) may sink an input current to the video pre-amplifier (e.g., 118) in a manner similar to that described herein with reference to FIGS. 1–4. At step 514, an equilibrium temperature is found by the current mode output temperature sensor (e.g., 126) so that the CRT driver (e.g., 124) operates at an optimal voltage within tolerable temperatures. As a result of step 514, the CRT-based display system (e.g., 100) avoids thermal shutdown or being damaged while the brightness of its picture is not sacrificed. The present embodiment does not end at step 514 but instead proceeds to step 510 in order to monitor whether the CRT driver (e.g., 124) is overheating.

Accordingly, the present invention provides a low-cost, compact, and light-weight method and system for solving the power dissipation problems inherent in high-resolution CRT display applications so that the high temperature generated by amplitude and frequency signals is handled without having a thermal shutdown or sacrificing picture quality.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A current mode output temperature sensor for providing thermal protection to a cathode ray tube (CRT) driver, the current mode output temperature sensor comprising:
   a comparator circuit coupled to a first current source;
   a voltage reference unit coupled to the comparator circuit and for providing a temperature independent voltage reference;
   a temperature sensing unit coupled to the comparator and for measuring temperature of the CRT driver; and
   a temperature threshold setup unit coupled to the temperature sensing unit and for setting a threshold temperature;
   wherein the current mode output temperature sensor thermally protects the CRT driver by reducing the amplitude of a video signal received by the CRT driver when the temperature of the CRT driver exceeds the temperature threshold.

2. The current mode output temperature sensor as described in claim 1 wherein the comparator circuit comprises an emitter-coupled pair comprising:
   a first transistor having a base forming a first input terminal of the comparator circuit, a collector coupled to an electrical ground, and an emitter; and
   a second transistor having a base forming a second input terminal of the comparator circuit, an emitter coupled to the emitter of the first transistor and to a second current source, and a collector forming an output of the comparator circuit.

3. The current mode output temperature sensor as described in claim 2 wherein the second current source comprises a resistor having a first terminal coupled to the emitter of the emitter-coupled pair and a second terminal coupled to a supply voltage.

4. The current mode output temperature sensor as described in claim 1 wherein the first current source comprises:
   a first transistor comprising a base, a collector coupled to the base, and an emitter coupled to an electrical ground; and
   a second transistor comprising a base coupled to the base of the first transistor, an emitter coupled to the electrical ground, and a collector coupled to an Automatic Brightness Limiter (ABL) circuit.

5. The current mode output temperature sensor as described in claim 1 wherein the voltage reference unit comprises:
   a first transistor having a base, a collector coupled to the base and to a voltage supply, and an emitter;
   a second transistor having a base, a collector coupled to the base and to the emitter of the first transistor, and an emitter; and
   a resistor having a first terminal coupled to the emitter of the second transistor and a second terminal coupled to the comparator.

6. The current mode output temperature sensor as described in claim 1 wherein the voltage reference unit comprises a transistor having a negative temperature coefficient VBE(on).

7. The current mode output temperature sensor as described in claim 1 wherein the temperature sensing unit comprises a transistor having a positive temperature coefficient collector current.

8. A cathode ray tube (CRT)-based display system using a current mode output temperature sensor, comprising:
   a video pre-amplifier;
   a CRT driver coupled to an output terminal of the video pre-amplifier;
   a CRT display unit coupled to an output terminal of the CRT driver;
   an Automatic Brightness Limiter (ABL) circuit coupled to a gain control terminal of the video pre-amplifier; and
   a current mode output temperature sensor coupled to the ABL circuit and the gain control terminal of the video pre-amplifier, the current mode output temperature sensor for thermally protecting the CRT driver by activating the ABL circuit and by reducing the amplitude of a video signal received by video pre-amplifier when the temperature of the CRT driver exceeds a temperature threshold.

9. The CRT-based display system as described in claim 8 wherein the current mode output temperature sensor comprises:
   a comparator circuit;
   a voltage reference unit coupled to the comparator circuit and for providing a temperature-independent voltage reference; and
   a temperature sensing unit coupled to the comparator and for measuring temperature of the CRT driver.

10. The CRT-based display system as described in claim 9 wherein the current mode output temperature sensor further comprises:
    a temperature threshold setup unit coupled to the temperature sensing unit and for setting the threshold temperature.

11. The CRT-based display system as described in claim 9 wherein comparator circuit comprises an emitter-coupled pair comprising:
    a first transistor having a base forming a first input terminal of the comparator circuit, a collector coupled to an electrical ground, and an emitter; and
    a second transistor having a base forming a second input terminal of the comparator circuit, an emitter coupled to the emitter of the first transistor and to a second current source, and a collector forming an output of the comparator circuit.

12. The CRT-based display system as described in claim 8 wherein the ABL circuit comprises:

a diode coupled to the gain control terminal of the video pre-amplifier; and a voltage supply coupled to the diode.

13. The CRT-based display system as described in claim 8 further comprising a video input coupled to the video pre-amplifier for providing the video signal to the CRT-based display system.

14. A method for using a current mode output temperature sensor to provide thermal protection to a cathode ray tube (CRT) driver, the method comprising:

setting a temperature independent reference voltage;

setting a threshold temperature for the current mode output temperature sensor;

coupling the current mode output temperature sensor to the CRT driver;

electrically coupling the current mode output temperature sensor to an Automatic Brightness Limiter (ABL) circuit;

determining if the temperature of the CRT driver exceeds the threshold temperature by utilizing the temperature independent reference voltage; and in response to the temperature of the CRT driver exceeding the threshold temperature, the current mode output temperature sensor activating the ABL circuit and reducing the amplitude of a video signal received by the CRT driver in order to thermally protect the CRT driver.

15. The method as described in claim 14 wherein the temperature independent reference voltage comprises a plurality of transistors coupled to a voltage supply.

16. The method as described in claim 14 wherein the setting the threshold temperature comprises utilizing a temperature threshold setup unit.

17. The method as described in claim 14 wherein the coupling the current mode output temperature sensor to the CRT driver further comprises fabricating the current mode output temperature sensor within the CRT driver.

18. The method as described in claim 14 wherein the coupling the current mode output temperature sensor to the CRT driver comprises attaching the current mode output temperature sensor to the CRT driver.

19. The method as described in claim 14 wherein the determining if the CRT driver exceeds the threshold temperature further comprises comparing a. voltage measured from the CRT driver and the temperature independent reference voltage.

20. The method as described in claim 14 wherein the reducing the amplitude of the video signal received by the CRT driver further comprises reducing a gain of a video pre-amplifier that outputs the video signal to the CRT driver.

* * * * *